(12) United States Patent
Zhang et al.

(10) Patent No.: US 9,581,826 B2
(45) Date of Patent: Feb. 28, 2017

(54) 3D DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hongshu Zhang, Beijing (CN); Yuqiong Chen, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/421,079

(22) PCT Filed: Jul. 4, 2013

(86) PCT No.: PCT/CN2013/078829
§ 371 (c)(1),
(2) Date: Feb. 11, 2015

(87) PCT Pub. No.: WO2014/173017
PCT Pub. Date: Oct. 30, 2014

(65) Prior Publication Data
US 2015/0212332 A1 Jul. 30, 2015

(30) Foreign Application Priority Data

Apr. 25, 2013 (CN) .......................... 2013 1 0147977

(51) Int. Cl.
G02B 27/22 (2006.01)

(52) U.S. Cl.
CPC ....... G02B 27/225 (2013.01); G02B 27/2214 (2013.01)

(58) Field of Classification Search
CPC ................ G02B 6/0033; G02B 27/225; G02F 1/133617; G02F 2001/133614; H04N 13/0456; H04N 13/0445; H04N 13/0454
(Continued)

(56) References Cited

U.S. PATENT DOCUMENTS 5,544,268 A * 8/1996 Bischel .................. G02F 1/011
385/16
5,568,298 A 10/1996 Mase et al.
(Continued)

FOREIGN PATENT DOCUMENTS

| CN | 1728016 A | 2/2006 |
|---|---|---|
| CN | 1987984 A | 6/2007 |

(Continued)

OTHER PUBLICATIONS

English translation of the International Preliminary Report on Patentability and Written Opinion of the International Searching Authority of PCT/CN2013/078829, issued Oct. 27, 2015.
(Continued)

*Primary Examiner* — Scott J Sugarman
*Assistant Examiner* — Mustak Choudhury
(74) *Attorney, Agent, or Firm* — Collard & Roe, P.C.

(57) ABSTRACT

A 3D display device comprises a display panel (1) with a plurality of pixel units formed by the cross of gate lines and data lines and distributed in matrix, and a photorefractive crystal mechanism (2) disposed at the light emitting side of the display panel (1); the photorefractive crystal mechanism (2) comprises an electrode structure (21) and a plurality of photo refractive crystals (22) arranged along the row directions of the pixel units; the electrode structure (21) produces a plurality of electric field range (A) in one-to-one correspondence with the photorefractive crystals (22); each of the photorefractive crystals (22) is corresponding to one electric
(Continued)

field range (A) and is located in the corresponding electric field range (A); the photorefractive crystals (22) in adjacent columns respectively emits left eye image light or right eye image light, and right eye image light or left eye image light.

13 Claims, 2 Drawing Sheets

(58) Field of Classification Search
USPC ... 359/7, 322, 324, 342, 376, 458, 462–469; 349/64; 348/E13.043, E13.044
See application file for complete search history.

(56) References Cited

U.S. PATENT DOCUMENTS

| | | | |
|---|---|---|---|
| 8,786,812 | B2 | 7/2014 | Miyazawa et al. |
| 2007/0146267 | A1 | 6/2007 | Jang et al. |
| 2007/0216828 | A1 | 9/2007 | Jacobs |
| 2009/0033812 | A1 | 2/2009 | Ijzerman et al. |
| 2010/0328440 | A1* | 12/2010 | Willemsen ......... G02B 27/2214 348/59 |
| 2013/0094069 | A1* | 4/2013 | Lee ........................ G03H 1/02 359/3 |
| 2013/0321897 | A1 | 12/2013 | Wang et al. |
| 2014/0028933 | A1 | 1/2014 | Chen et al. |
| 2014/0307179 | A1 | 10/2014 | Zhao et al. |

FOREIGN PATENT DOCUMENTS

| | | |
|---|---|---|
| CN | 101395928 A | 3/2009 |
| CN | 101510015 A | 8/2009 |
| CN | 101939998 A | 1/2011 |
| CN | 102692768 A | 9/2012 |
| CN | 102749717 A | 10/2012 |
| CN | 203178581 U | 9/2013 |
| JP | S63-246721 A | 10/1988 |
| WO | 2005/071976 A1 | 8/2005 |
| WO | 2012/103996 A1 | 8/2012 |
| WO | 2012/112876 A1 | 8/2012 |

OTHER PUBLICATIONS

Chinese Office Action of Chinese Application No. 201310147977.1, mailed Apr. 3, 2015 with English translation.
International Search Report of PCT/CN2013/078829 in English, mailed Feb. 13, 2014.

* cited by examiner

3D DISPLAY DEVICE

CROSS REFERENCE TO RELATED APPLICATIONS

This application is the National Stage of PCT/CN2013/078829 filed on Jul. 4, 2013, which claims priority under 35 U.S.C. §119 of Chinese Application No. 201310147977.1 filed on Apr. 25, 2013, the disclosure of which is incorporated by reference.

TECHNICAL FIELD

Embodiments of the present invention relate to a 3D display device.

BACKGROUND

The three-dimensional (3D) display technology is to endow a viewer with a stereoscopy by utilizing a binocular stereoscopic vision principle, and its main principle is that, different images are received by left and right eyes of the viewer, respectively, the two images having the "binocular parallax" constitute a "stereoscopic image pair" due to a position difference produced by the pupil distance between two eyes of the viewer, and a stereoscopic effect is produced after the "stereoscopic image pair" is fused in the brain.

Currently, the 3D display technology mainly has two broad categories: a glasses type and a naked-eye type. The so-called naked-eye type is that, by disposing a parallax barrier or a lenticular lens at a light exiting side of a liquid crystal display device, the viewer is allowed to experience a stereoscopic sensation with his naked eyes, without the help of glasses.

SUMMARY

Embodiments of the present invention provide a 3D display device capable of achieving naked-eye 3D display.

The 3D display device according to an embodiment of the present invention comprises: a display panel, having a plurality of pixel units in a matrix form defined by gate lines and data lines crossed each other; and a photorefractive crystal member, arranged at a light exiting surface side of the display panel and comprising an electrode structure and a plurality of photorefractive crystals arranged in a row direction of the plurality of the pixel units, the electrode structure generating a plurality of electric field regions corresponding to the plurality of photorefractive crystals in a one-to-one correspondence relationship, each of the photorefractive crystals corresponding to one of the electric field region and being located within a corresponding electrical field region; adjacent columns of photorefractive crystals emitting light for a left eye image/light for a right eye image and the light for the right eye image/the light for the left eye image.

Alternatively, electric field intensity of each electric field region is adjustable separately.

Alternatively, the electrode structure comprises a plurality of strip electrodes arranged in a row direction of the pixel units, each strip electrode extends along a column direction of the pixel units, and one of the electric field regions is formed between every two adjacent strip electrodes.

Alternatively, the photorefractive crystals and the strip electrodes are alternately arranged.

Alternatively, each of the strip electrodes in the electrode structure is attached to the adjacent photorefractive crystal.

Alternatively, the photorefractive crystals have an identical thickness in a direction perpendicular to a light exiting surface direction of the display panel.

Alternatively, for the plurality of photorefractive crystals arranged in the row direction of the pixel units, the thicknesses thereof in the direction perpendicular to the light exiting surface direction of the display panel is decreased from each of two edges to middle along the row direction of the pixel units.

Alternatively, the photorefractive crystal member is attached to the light exiting surface of the display panel.

Alternatively, each of the photorefractive crystal corresponds to one column of the pixel units.

Alternatively, the photorefractive crystal is formed by barium titanate, potassium niobate, or potassium tantalate niobate of perovskite structure, or is formed by barium sodium niobate, strontium barium niobate or potassium sodium strontium barium niobate of tungsten bronze structure.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
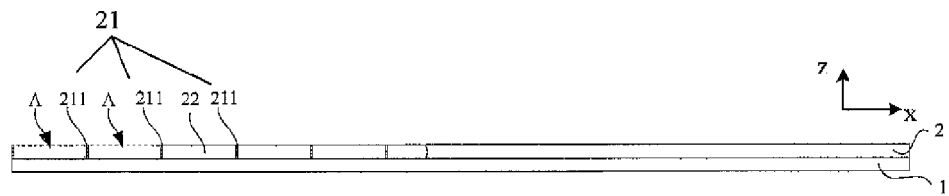
FIG. 1 is a view showing a cross-sectional structure of a 3D display device according to an embodiment of the present invention.
Figure 2:
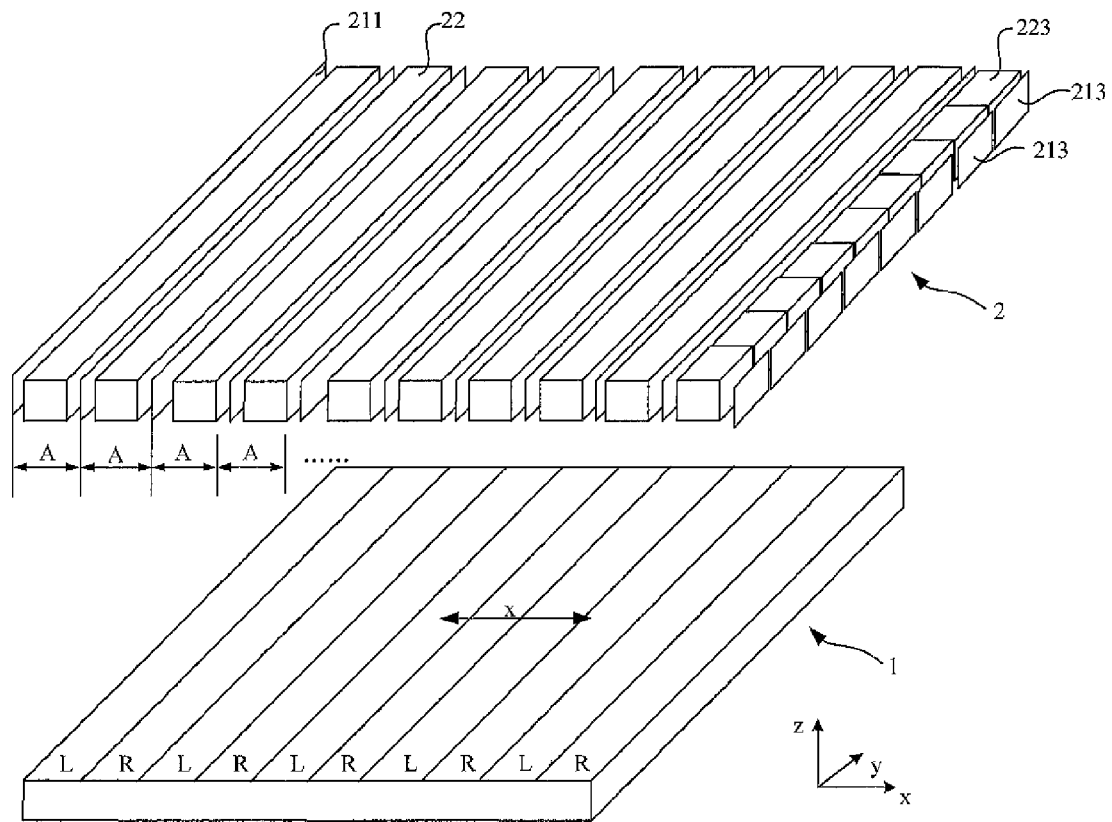
FIG. 2 is a decomposed perspective view of a 3D display device according to an embodiment of the present invention.

As shown in FIGS. 1 and 2, a 3D display device according to an embodiment of the invention comprises: a display panel 1 having a plurality of pixel units in a matrix form defined by gate lines and data lines intersecting to each other; and a photorefractive crystal member 2, arranged at a light exiting surface side of the display panel 1 and including an electrode structure 21 and a plurality of photorefractive crystals 22 arranged in a row direction x (as shown in FIG. 2) of the plurality of the pixel units of the display panel 1, the electrode structure 21 generating a plurality of electric field regions A corresponding to the plurality of photorefractive crystals 22 one by one. That is to say, each of the plurality of photorefractive crystals 22 corresponds to one electric field region A generated by the electrode structure 21 and is located within the corresponding electric field region A. Adjacent columns of photorefractive crystals 22 respectively emit light for a left eye image/light for a right eye image and the light for the right eye image/the light for the left eye image.

Figure 3:
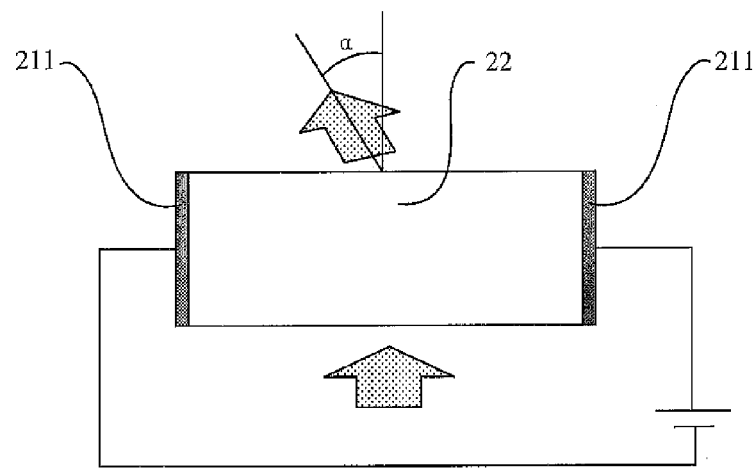
FIG. 3 is a schematic diagram showing light-adjusting principle of a photorefractive crystal in a 3D display device according to an embodiment of the present invention.

The photorefractive crystal 22 is located within the electric field region A generated by the electrode structure 21. Referring to FIG. 3, under the effect of the electric field within the electric field region A, a charge carrier within the photorefractive crystal 22 drifts such that a refractive index within the photorefractive crystal 22 is correspondingly changed, so the photorefractive crystal 22 can modulate entered incident light; furthermore, since the photorefractive crystals 22 in electric field regions A with different electric field intensities have different refractive indices, the function of modulating the incident light into the photorefractive crystals 22 differs as well. Therefore, as shown in FIG. 3, the refractive index of the photorefractive crystal 22 in each electric field region A may be adjusted by adjusting the electric field intensity of each electric field region A and by adjusting a thickness of the photorefractive crystal 22 in a direction perpendicular to a light exiting surface direction of the display panel 1, i.e. in a z direction, so that an exit angle α of the incident light departed from the photorefractive crystal 22 is adjusted to make the adjacent columns of photorefractive crystals 22 project the light for the left eye image/the light for the right eye image and the light for the right eye image/the light for the left eye image into a left eye/a right eye and the right eye/the left eye of a viewer respectively, thereby achieving the naked-eye 3D display.

Figure 4:
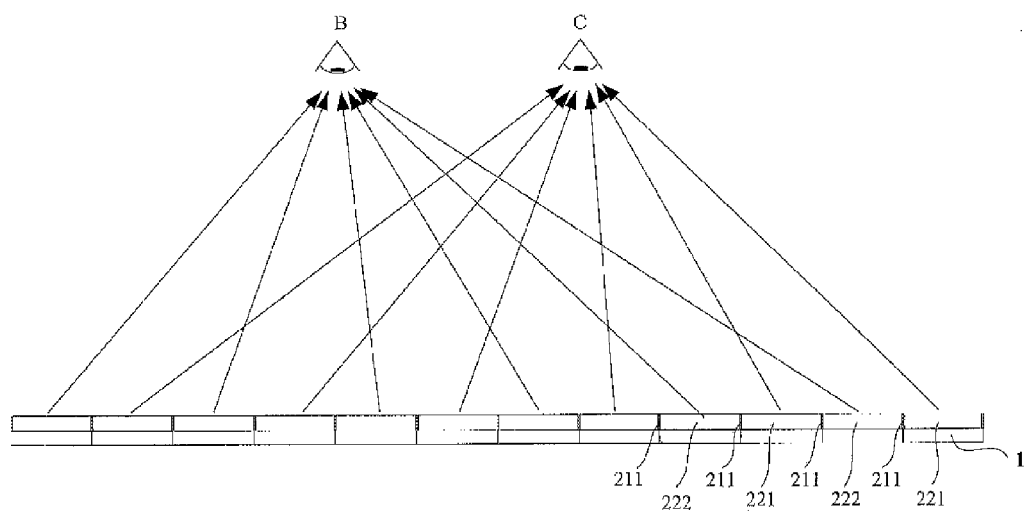
FIG. 4 is a principle diagram of naked-eye 3D display of a 3D display device according to an embodiment of the present invention.

Exemplarily, for easy illustration, two adjacent columns of photorefractive crystals 22, as shown in FIG. 4, are denoted as a first photorefractive crystal 221 and a second photorefractive crystal 222 alternately arranged; the refractive indices of the first photorefractive crystal 221 and the second photorefractive crystal 222 may be adjusted by adjusting the electric field intensities of the electric field regions A where the first photorefractive crystal 221 and the second photorefractive crystal 222 are positioned, such that lights refracted by the second photorefractive crystals 222 converge into the viewer's right eye B and lights refracted by the first photorefractive crystals 221 converge into the viewer's left eye C, and the second photorefractive crystals 222 emit the light for the right eye image and the first photorefractive crystals 221 emit the light for the left eye image, thereby achieving the naked-eye 3D display.

It should be noted that the above illustration is just an example showing that the second photorefractive crystals 222 emit the light for the right eye image and the first photorefractive crystals 221 emit the light for the left eye image, but the second photorefractive crystals 222 may emit the light for the left eye image and the first photorefractive crystals 221 may emit the light for the right eye image. The embodiments of the present invention are not limited to this.

Alternatively, in order to control each of the photorefractive crystals 22 separately so as to control 3D display more precisely, the electric field intensity of each electric field region A in the electrode structure 21 may be modulated separately.

Exemplarily, the electrode structure 21 of the 3D display device according to an embodiment of the present invention, as illustrated in FIGS. 1 and 2, comprises a plurality of strip electrodes 211 arranged along a row direction x of the pixel units of the display panel 1, wherein each strip electrode 211 extends along a column direction of the pixel units of the display panel 1 and one electric field region A is formed between every two adjacent strip electrodes 211.

Exemplarily, in the plurality of strip electrodes 211 of the electrode structure 21, positive electrodes and negative electrodes may be arranged alternately at an interval. That is to say, among the plurality of strip electrodes, those with high potential and those with low potential are arranged alternately at an interval, and the potentials of the corresponding strip electrodes may be adjusted according to refractive index requirement of the photorefractive crystal 22 in each of the electric field regions A, thereby adjusting the electric field intensity of each electric field region A to meet requirement of naked-eye 3D display. Further, the electric field intensity of each electric field region A may be adjusted by adjusting the potential of each of the strip electrodes so as to adjust a converging point of the light for the right eye image emitted from the second photorefractive crystals 222 and a converging point of the light for the left eye image emitted from the first photorefractive crystals 221 to meet viewing requirements of viewers at different positions.

Exemplarily, the photorefractive crystals 22 and the strip electrodes 211 of the electrode structure 21 are arranged alternately, and the alternately arrangement of the strip electrodes and the photorefractive crystals 22 means that an electric field generated in the corresponding electric field region A by every two adjacent strip electrodes is a parallel electric field in a direction from the strip electrode of high potential to the strip electrode of low potential. Homogeneity of electric field distribution in the electric field region A is increased, so the stability of adjusting the refractive index of the photorefractive crystal 22 can be improved.

Exemplarily, in the electrode structure 21, each of the strip electrodes 211 may be attached to the adjacent photorefractive crystal 22.

Exemplarily, as shown in FIG. 2, in the photorefractive crystal member 2 according to an embodiment of the present invention, the photorefractive crystal 22 in each electric field region A may be an integral strip structure and may also be formed by a plurality of sub-photorefractive crystals 223 tightly arranged in a column direction of the pixel units of the display panel 1, i.e. in y direction. Accordingly, the strip electrode 211 of the electrode structure 21 may be a sub-electrode 213 corresponding to the sub-photorefractive crystal 223.

Alternatively, the thickness of each photorefractive crystal 22 in a direction perpendicular to the light exiting surface direction of the display panel 1, i.e. z direction is identical. The refractive index of the photorefractive crystals 22 pertains to the thickness thereof as well as the electric filed intensity applied thereto. Since the thicknesses of the photorefractive crystals 22 are the same, the refractive index of each photorefractive crystal 22 may be adjusted by controlling the electric field intensity in each electric field region, so as to adjust the exit angle α of the incident light when departing from the photorefractive crystal 22, such that adjacent columns of photorefractive crystals 22 make the light for the left eye image/the light for the right eye image and the light for the right eye image/the light for the left eye image to enter the viewer's left eye/right eye and the right eye/left eye to achieve naked-eye 3D display.

Alternatively, for the plurality of photorefractive crystals 22 arranged in the row direction of the pixel units of the display panel 1, the thicknesses thereof in the direction perpendicular to the light exiting surface direction of the display panel 1, i.e. the z direction, is decreased from each of two edges to middle along the row direction. The electric field intensities in adjacent columns of the electric field regions A are the same, and by way of controlling the thickness of the photorefractive crystals 22, the adjacent columns of photorefractive crystals 22 make the light for the left eye image/the light for the right eye image and the light for the right eye image/the light for the left eye image to respectively enter the right eye/the left eye and the left eye/the right eye of the viewer so as to achieve naked-eye 3D display.

Alternatively, in the 3D display device according to an embodiment of the present invention, the electrode structure 21 and the photorefractive crystal 22 of the photorefractive crystal member 2 may be attached to the light exiting surface of the display panel 1.

The electrode structure 21 and the photorefractive crystal 22 of the photorefractive crystal member 2 may be formed directly on the light exiting surface of the display panel 1.

Alternatively, in the 3D display device according to the embodiments of the present invention, each photorefractive crystal 22 corresponds to one column of pixel units in the display panel 1.

Of course, each photorefractive crystal 22 may correspond to two or more columns of pixel units; the corresponding relation between the photorefractive crystals 22 and the pixel units may be determined based on the outputting condition and practical requirements of the display panel 1.

Alternatively, in the 3D display device according to the embodiments of the present invention, each photorefractive crystal 22 is formed by barium titanate, potassium niobate, or potassium tantalate niobate of perovskite structure, or is formed by barium sodium niobate, strontium barium niobate or potassium sodium strontium barium niobate of tungsten bronze structure.

In the 3D display device according to the embodiments of the present invention, the photorefractive crystals are located in the electric field regions generated by the electrode structure. Under the effect of the electric field within the electric field regions, a charge carrier in the photorefractive crystal drifts such that the refractive index of the photorefractive crystal is correspondingly changed, so the photorefractive crystal can modulate incident light entering the photorefractive crystal. Furthermore, since the photorefractive crystals in the electric field regions A with different electric field intensities have different refractive indices, the function of modulating the incident light entering the photorefractive crystal differs as well. Therefore, the refractive index of the photorefractive crystal in each of the electric field regions can be adjusted by adjusting the electric field intensity of each electric field region in the electrode structure in conjunction with adjusting the thickness of the photorefractive crystal in the direction perpendicular to the light exiting surface direction of the display panel, the exit angle of the incident light departed from the photorefractive crystal can be adjusted to make the adjacent columns of photorefractive crystals make light for left eye image/light for right eye image and the light for right eye image/the light for left eye image into the left eye/the right eye and the right eye/the left eye of the viewer respectively, thereby achieving naked-eye 3D display.

It is apparent that various modification and variants can be made to the embodiments of the present invention without departing from the spirit and scope of the invention. Such modifications and variants, if within the scope of the claims and equivalent technologies, are intended to be encompassed within the present invention.

The application claims priority to the Chinese patent application No. 201310147977.1 filed on Apr. 25, 2013, which is incorporated herein by reference in its entirety.

The invention claimed is:

1. A 3D display device, comprising:
a display panel, having a plurality of pixel units in a matrix form defined by gate lines and data lines crossed each other; and
a photorefractive crystal member, arranged at a light exiting surface side of the display panel and comprising an electrode structure and a plurality of photorefractive crystals arranged in a row direction of the plurality of the pixel units, the electrode structure generating a plurality of electric field regions corresponding to the plurality of photorefractive crystals in a one-to-one correspondence relationship, each of the photorefractive crystals corresponding to one of the electric field region and being located within a corresponding electrical field region; adjacent columns of photorefractive crystals emitting light for a left eye image/light for a right eye image and the light for the right eye image/the light for the left eye image;
wherein the electrode structure comprises a plurality of strip electrodes arranged in the row direction of the pixel units, each strip electrode extends along a column direction of the pixel units, and one of the electric field regions is formed between every two adjacent strip electrodes to allow an electrical field generated by the every two adjacent strip electrodes in operation to be parallel to a light existing surface of the display panel, the photorefractive crystals and the strip electrodes are alternately arranged, and each of the strip electrodes in the electrode structure is attached to row direction sides of the adjacent photorefractive crystal.

2. The 3D display device according to claim 1, wherein electric field intensity of each electric field region is adjustable separately.

3. The 3D display device according to claim 1, wherein the photorefractive crystals have an identical thickness in a direction perpendicular to a light exiting surface direction of the display panel.

4. The 3D display device according to claim 1, wherein for the plurality of photorefractive crystals arranged in the row direction of the pixel units, the thicknesses thereof in a direction perpendicular to a light exiting surface direction of the display panel are decreased from each of two edges to middle along the row direction of the pixel units.

5. The 3D display device according to claim 1, wherein the photorefractive crystal member is attached to the light exiting surface of the display panel.

6. The 3D display device according to claim 1, wherein each of the photorefractive crystal corresponds to one column of the pixel units.

7. The 3D display device according to claim 1, wherein the photorefractive crystal is formed by barium titanate, potassium niobate, or potassium tantalate niobate of perovskite structure.

8. The 3D display device according to claim 1, wherein the photorefractive crystal is formed by barium sodium niobate, strontium barium niobate or potassium sodium strontium barium niobate of tungsten bronze structure.

9. The 3D display device according to claim 8, wherein the electrode structure comprises a plurality of sub-electrodes corresponding to the plurality of sub-photorefractive crystals in a one-to-one correspondence relationship.

10. The 3D display device according to claim 1, wherein each of the plurality of photorefractive crystals comprises a plurality of sub-photorefractive crystals arranged continuously along a column direction of the pixel units.

11. The 3D display device according to claim 1, wherein each of the photorefractive crystals corresponds to two or more columns of pixel units.

12. The 3D display device according to claim 1, wherein each of the photorefractive crystals is formed into an integral strip photorefractive crystal.

13. The 3D display device according to claim 1, wherein the photorefractive crystal member is formed directly on the light exiting surface of the display panel.

* * * * *